United States Patent
Jin

(10) Patent No.: US 10,166,872 B2
(45) Date of Patent: Jan. 1, 2019

(54) RANGE EXTENDER VEHICLE

(71) Applicant: TECHNOLOGIES' XANADU OF RESONATORY-SOLAR-SYSTEMED CO., LTD., Beijing (CN)

(72) Inventor: Pu Jin, Beijing (CN)

(73) Assignee: TECHNOLOGIES' XANADU OF RESONATORY-SOLAR-SYSTEMED CO., LTD., Beijing (CN)

( * ) Notice: Subject to any disclaimer, the term of this patent is extended or adjusted under 35 U.S.C. 154(b) by 0 days.

(21) Appl. No.: 15/560,628

(22) PCT Filed: Jan. 13, 2016

(86) PCT No.: PCT/CN2016/070749
§ 371 (c)(1),
(2) Date: Sep. 22, 2017

(87) PCT Pub. No.: WO2016/150238
PCT Pub. Date: Sep. 29, 2016

(65) Prior Publication Data
US 2018/0093575 A1    Apr. 5, 2018

(30) Foreign Application Priority Data

Mar. 24, 2015   (CN) .......................... 2015 1 0129254

(51) Int. Cl.
*B60W 10/08* (2006.01)
*B60L 11/12* (2006.01)
(Continued)

(52) U.S. Cl.
CPC .............. *B60L 11/123* (2013.01); *B60K 6/24* (2013.01); *B60K 6/46* (2013.01); *B60L 11/12* (2013.01);
(Continued)

(58) Field of Classification Search
CPC . B60K 6/08; B60K 6/10; B60K 6/105; B60K 6/30
(Continued)

(56) References Cited

U.S. PATENT DOCUMENTS 3,813,557 A    5/1974    Traeger
4,199,037 A    4/1980    White
(Continued)

FOREIGN PATENT DOCUMENTS

CN    2698988 Y    5/2005
CN    102658779 A    9/2012
(Continued)

OTHER PUBLICATIONS

Office Action issued in corresponding Chinese Application No. 201510129254.8, dated Jun. 20, 2016 (12 pages).
(Continued)

*Primary Examiner* — Jeffrey J Restifo
(74) *Attorney, Agent, or Firm* — Osha Liang LLP

(57) ABSTRACT

A range extender vehicle includes: a turboshaft engine, a turboshaft engine controller, a generator, a battery pack, a battery controller, driving motors, a battery heat radiator, and a gasholder. A signal end of the turboshaft engine is connected to the turboshaft engine controller. A transmission shaft of the turboshaft engine is connected to a rotatory shaft of the generator. The generator outputs electric energy to the battery pack and the driving motor respectively. The battery pack and the driving motor are connected together and are connected to the battery controller at the signal end. The transmission shaft of the driving motor is connected to the wheel.

6 Claims, 2 Drawing Sheets

(51) Int. Cl.
*B60W 20/13* (2016.01)
*F01D 15/10* (2006.01)
*F02C 7/08* (2006.01)
*B60K 6/46* (2007.10)
*B60W 10/06* (2006.01)
*B60W 10/26* (2006.01)
*B60W 30/18* (2012.01)
*F02C 9/18* (2006.01)
*B60W 20/10* (2016.01)
*B60K 6/24* (2007.10)
*F02C 7/06* (2006.01)
*F02C 6/20* (2006.01)

(52) U.S. Cl.
CPC ............ *B60W 10/06* (2013.01); *B60W 10/08* (2013.01); *B60W 10/26* (2013.01); *B60W 20/10* (2013.01); *B60W 20/13* (2016.01); *B60W 30/18054* (2013.01); *F01D 15/10* (2013.01); *F02C 6/20* (2013.01); *F02C 7/06* (2013.01); *F02C 7/08* (2013.01); *F02C 9/18* (2013.01); *B60L 2220/10* (2013.01); *B60W 2510/244* (2013.01); *B60W 2510/246* (2013.01); *B60Y 2400/431* (2013.01); *F05D 2220/76* (2013.01); *Y02T 10/7005* (2013.01); *Y02T 10/7077* (2013.01); *Y02T 10/7258* (2013.01)

(58) Field of Classification Search
USPC ...................................... 180/68.1, 68.2, 165
See application file for complete search history.

(56) References Cited

U.S. PATENT DOCUMENTS

| | | |
|---|---|---|
| 4,951,769 A | 8/1990 | Kawamura |
| 5,765,656 A | 6/1998 | Weaver |
| 2004/0090204 A1 | 5/2004 | McGinley |
| 2008/0121448 A1 | 5/2008 | Betz et al. |
| 2011/0146614 A1 | 6/2011 | Wenger et al. |
| 2012/0255799 A1 | 10/2012 | Kohler et al. |
| 2018/0093575 A1 | 4/2018 | Jin |
| 2018/0141442 A1 | 5/2018 | Pu |

FOREIGN PATENT DOCUMENTS

| | | |
|---|---|---|
| CN | 102673412 A | 9/2012 |
| CN | 202782642 U | 3/2013 |
| CN | 103273829 A | 9/2013 |
| CN | 104786858 A | 7/2015 |
| CN | 104802629 A | 7/2015 |
| CN | 204586535 U | 8/2015 |
| CN | 204605496 U | 9/2015 |
| DE | 102007004172 A1 | 7/2008 |
| DE | 102009045979 A1 | 4/2011 |
| FR | 2734318 A1 | 11/1996 |
| WO | 2011083369 A1 | 7/2011 |

OTHER PUBLICATIONS

International Search Report issued in corresponding application No. PCT/CN2016/070749 dated Apr. 19, 2016 (10 pages).
Written Opinion of the International Searching Authority issued in corresponding application No. PCT/CN2016/070749 dated Apr. 19, 2016 (12 pages).
Extended European Search Report issued in corresponding European Application No. 16767615.4 dated Jul. 27, 2018 (10 pages).
Office Action issued in corresponding Singapore Application No. 11201707764Y dated Jul. 12, 2018 (6 pages).

RANGE EXTENDER VEHICLE

CROSS REFERENCE TO RELATED APPLICATION

This application is a U.S. national phase of International Application No. PCT/CN2016/070749, which is based upon and claims a priority to Chinese Patent Application Serial No. 201510129254.8, filed with the State Intellectual Property Office of P. R. China on Mar. 24, 2015, titled "Range Extender Vehicle", the entire contents of which are incorporated herein by reference.

TECHNICAL FIELD

The present disclosure relates to the field of vehicles, and more particularly, to a range extender vehicle.

BACKGROUND

As air quality becomes bad, and an increasing number of people have an enhanced intention of environment protection, a range extender vehicle, as a new energy vehicle, is more and more popular to people in the promotion of various objective factors.

The range extender vehicle refers to an electric vehicle driven by pure electric energy and equipped with an on-ground power supply capability and an on-board power supply capability. That is, the range extender vehicle is entirely driven by electric energy. A power system of the range extender vehicle includes a power battery pack, a power driving unit, a vehicle control unit and an auxiliary power unit (APU), and a running-controlling strategy is performed via a vehicle controller of the vehicle control unit.

SUMMARY

A range extender vehicle is provided by embodiments of the present disclosure, including: wheels; a vehicle frame; a turboshaft engine arranged on a chassis of the vehicle frame; a turboshaft engine controller; a generator; a battery pack; a battery controller; driving motors, a battery radiator and a gasholder;

in which, a signal end of the turboshaft engine is connected to the turboshaft engine controller, a transmission shaft of the turboshaft engine is connected to a rotation shaft of the generator and is configured to drive the generator to produce electric energy;

the generator is configured to output the produced electric energy to the battery pack and the driving motors; the battery pack is connected to the driving motors and a signal end of the battery pack is connected to the battery controller;

a power transmission shaft of each of the driving motors is connected to a driving shaft of the corresponding wheel;

a cold-air channel of the battery radiator is connected to the battery pack; and a gas-transmission pipe of the gasholder is connected to a gas-inputting pipe of a combustor of the turboshaft engine, to provide gas to the turboshaft engine.

Embodiments of the present disclosure further provide a method for charging the range extender vehicle as described above, and the method includes:

a static charge mode: when the driving motors are not in operation, controlling, via the central controller, the generator to charge the battery pack slowly or quickly;

a moving charge mode: when the driving motors work under a standard power, controlling, via the central controller, the generator to supply power to the battery pack; when the driving motors work under an extra-high power, controlling, via the central controller, the generator and the battery pack to supply power to the driving motors together;

when the battery pack is exhausted and it is required a high performance of driving, controlling, via the central controller, the generator to directly drive the driving motors with a huge power and not charge the battery pack; when power consumption is reduced such that the driving motors work under the standard power, entering to the moving charge mode; when the vehicle is stopped, entering the static charge mode automatically.

Embodiments of the present disclosure further provide a turboshaft engine, and the turboshaft engine includes:

a combustor, a pressure-regulating nozzle, an intake turbine, an outtake turbine, a tailpipe and a transmission shaft;

in which the intake turbine employs a first turbine rotor with suspension rotation mode on which first guide vanes are arranged, and the first guide vanes are mounted at an inlet of a gas-inputting pipe of the combustor, and the first guide vanes are configured to guide gas to the gas-inputting pipe;

an inlet of the combustor is connected to the gas-inputting pipe, and a tail end of the combustor is provided with the transmission shaft and the outtake turbine;

the outtake turbine employs a second turbine rotor with suspension rotation mode on which second guide vanes are arranged, in which an outlet of a cavity where the second guide vanes are located is connected to an inlet of the tailpipe; the pressure-regulating nozzle is arranged at the front of the inlet of the combustor, to regular a gas pressure for entering into the combustor.

Figure 1:
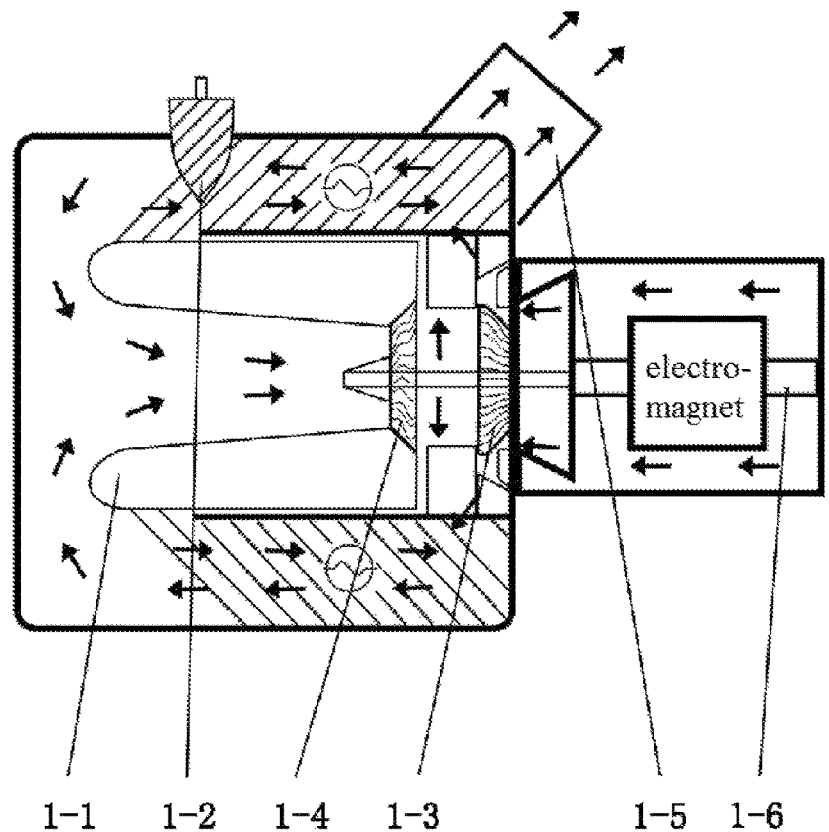
FIG. 1 is a schematic diagram illustrating a turboshaft engine according to embodiments of the present disclosure.

REFERENCE NUMERALS combustor 1-1; pressure-regulating nozzle 1-2; intake turbine 1-3; outtake turbine 1-4; tailpipe 1-5; transmission shaft 1-6, turboshaft engine 1; turboshaft engine controller 2; generator 3; battery pack 4; battery controller 5; driving motor 6, battery radiator 7; battery thermal energy manage system (not illustrated in Figs.); gasholder 9; central controller 10; wheel 11; vehicle frame 12; thermal energy recycling device 13; thermal energy transmission pipe 14 and compressed air heater 15.

DETAILED DESCRIPTION

The inventor of the present disclosure has thought out that a thermal efficiency of a turboshaft engine used in helicopters, tanks, or thermal power stations may even reach 30% to 60%. Therefore, it is no doubt to have many advantages to select the turboshaft engine as a generator set in a power driving system of a range extender vehicle. However, as the range extender vehicle is significantly smaller in size than the helicopters, the tanks and the thermal power stations, the turboshaft engine may be used by the range extender vehicle only if the turboshaft engine used in above applications must be manufactured in a smaller size. However, if it is required to reduce the size of the turboshaft engine, following technical problems need to be solved.

Firstly, it is required to improve a machining precision of each component, which may result in increased difficulty on manufacture processes.

Secondly, as the size of each component is smaller, it is required to increase a rotation speed of the engine under the same power. However, with the increase of the rotation speed of the engine, a series of problems may be followed, such as louder noise, higher temperature and the like. As the temperature is higher, it is required to take rotor lubrication into consideration. Especially for a gas turbine with an ultra-high rotation speed and a high power to weight ratio, a relatively high rotation speed brings an enormous centrifugal force to throw lubricator away from the rotor, such that the rotor lubrication is insufficient. As a result, working conditions deteriorate due to an increase of the temperature at a contact point of the rotor. Therefore, a service life of the engine is seriously shortened.

In conclusion, it may be seen that, there is a requirement to reform structures of the turboshaft engine used in the helicopters, tanks, and thermal power stations. The reformed turboshaft engine may be applied to the range extender vehicle. Embodiments of the present disclosure are to reform this turboshaft engine, such that the turboshaft engine and other components in the vehicle may work together to drive the range extender vehicle.

Details of the technical solutions will be described in combination with the drawings.

A turboshaft engine is provided by embodiments of the present disclosure. The structure of the turboshaft engine is illustrated in FIG. 1. The turboshaft engine includes: a combustor 1-1, a pressure-regulating nozzle 1-2, an intake turbine 1-3, an outtake turbine 1-4, a tailpipe 1-5 and a transmission shaft 1-6.

The intake turbine 1-3 employs a first turbine rotor with suspension rotation mode. A gap between an edge of the rotor and an inside wall of a cavity of the turboshaft engine is significant small. When a strong air-flow flows through the gap, a huge acting force may be generated to push the turbine rotor with suspension rotation mode to rotate. Higher the rotation speed is, bigger the acting force is. First guide vanes are arranged on the intake turbine 1-3 and are mounted at an inlet of a gas-inputting pipe of the combustor 1-1, and are configured to guide the gas to the gas-inputting pipe of the combustor 1-1. The combustor 1-1 is of a certain length, such that the air-flow may flow rapidly to make the combustion sufficient. An inlet of the combustor 1-1 is connected to the gas-inputting pipe, and a tail end of the combustor 1-1 is provided with the transmission shaft 1-6 and the outtake turbine 1-4. The outtake turbine 1-4 also employs second turbine rotor with suspension rotation mode on which also second guide vanes are arranged. An outlet of a cavity where second guide vanes are located is connected to an inlet of the tailpipe 1-5. The pressure-regulating nozzle 1-2 is arranged at the front of the inlet of the combustor 1-1 to regular a gas pressure for entering into the combustor 1-1.

As the turboshaft engine employs the turbine rotors with suspension rotation mode, the turbine rotors are not contacted to any parts of the turboshaft engine. No matter how high the rotation speed is, the temperature of the turbine rotors is not influenced. Therefore, the lubrication problem of the turbine rotors is perfectly avoided, which not only prolongs the service life of the turboshaft engine, but also brings an ultra-long maintenance period of the turboshaft engine, such that the turboshaft engine may work more safely and more stably.

As the combustion process of the turboshaft engine is continuous and uninterrupted in the combustor 1-1, and the combustor 1-1 is of a certain length, sufficient time and sufficient oxygen may be provided for the combustion process to make a complete combustion. Therefore, compared to the conventional piston typed engine, components of the emission generated by the turboshaft engine are environmentally friendlier. The components of the emission are equivalent to $\frac{1}{10}$ to $\frac{1}{20}$ of respective counterparts regulated by the Euro 5 emission standard. Moreover, it is avoided to utilize a full set of tail gas treatment system, let alone the maintenance and servicing of the tail gas treatment system. Therefore, environment pollution resulted from failing to process the exhaust gas may be avoided, to actually achieve, from the root, the improvement of emission treating and the improvement of environment protection performance.

Figure 2:
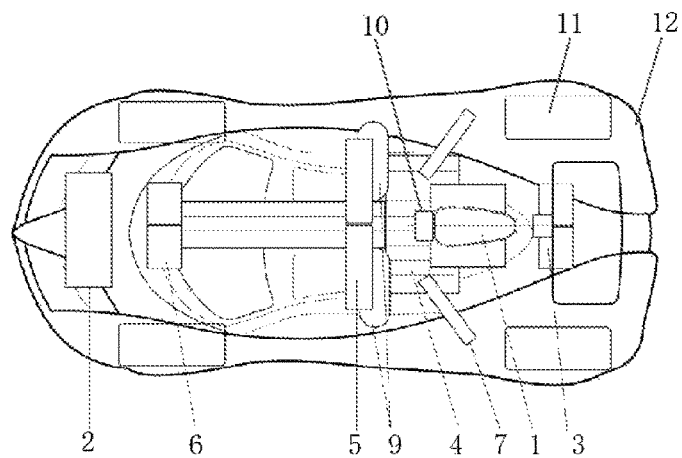
FIG. 2 is a top view of a range extender vehicle according to embodiments of the present disclosure.
Figure 3:
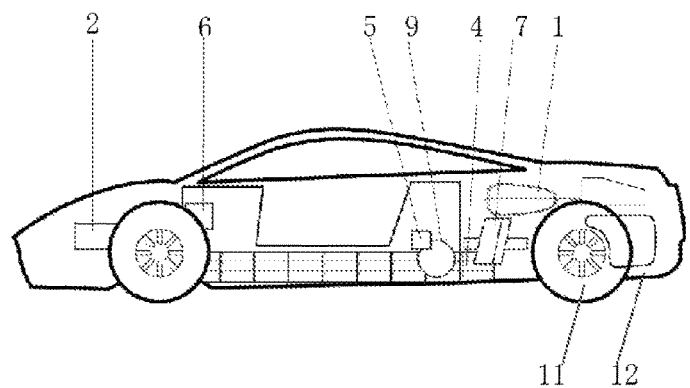
FIG. 3 is a front view of a range extender vehicle according to embodiments of the present disclosure.

The range extender vehicle with structures illustrated as FIG. 2 and FIG. 3 is further provided by embodiments of the present disclosure. In detail, the range extender vehicle includes: a turboshaft engine 1, a turboshaft engine controller 2, a generator 3, a battery pack 4, a battery controller 5, driving motors 6, a battery radiator 7, a battery thermal energy management system (not illustrated), a gasholder 9, a central controller 10, wheels 11 and a vehicle frame 12.

The vehicle frame 12 includes a housing of the vehicle, a classis and a manipulating device arranged on the classis. The turboshaft engine 1, the turboshaft engine controller 2, the generator 3, the battery pack 4, the battery controller 5, the driving motors 6, the battery radiator 7, the battery thermal energy management system, the gasholder 9 and the central controller 10 are arranged on the classis.

A signal end of the turboshaft engine 1 is connected to the turboshaft engine controller 2. The turboshaft engine controller 2 is configured to control and regulate an output power of the turboshaft engine 1 via the signal end.

A transmission shaft 1-6 of the turboshaft engine 1 is connected to a rotation shaft of the generator 3, to drive the generator 3 to produce the electric energy and to provide the electric power to the vehicle. Therefore, the turboshaft engine 1 and the generator 3 are together called as a generator set. The generator set is configured to output electric energy to the battery pack 4 and the driving motors 6. The battery pack 4 is also connected to the driving motors 6, and is connected to the battery controller 5 at its signal end. The battery controller 5 is configured to regulate and to control the output power of the battery pack 4.

Figure 4:
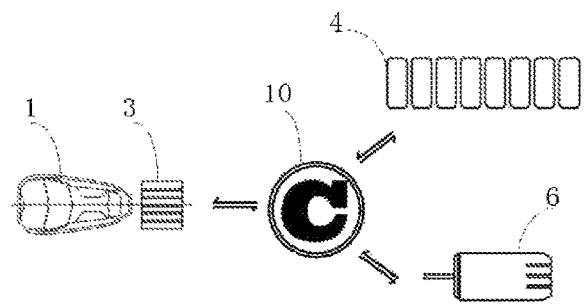
FIG. 4 is a schematic diagram illustrating control lines of a central controller of a range extender vehicle according to embodiments of the present disclosure.

As illustrated in FIG. 4, the signal end of the generator set including the turboshaft engine 1 and the generator 3, the signal end of the battery pack 4 and the signal ends of the driving motors 6 are connected to the central controller 10.

There are two paths that the electric energy produced by the generator set including the turboshaft engine 1 and the generator 3 flows to, one is the battery pack 4, and the other one is the driving motors 6. This means, the battery pack 4 may be charged separately, without providing electric energy to the driving motors 6. Alternatively, the electric energy of rated power is distributed to the driving motors 6 and the battery pack 4 respectively according to a control ratio (a calculated result of the central controller) provided by the central controller 10. Even when the battery pack 4 has no electric energy stored therein, and it is required that the driving motors 6 work under a maximum power, the generator set including the turboshaft engine 1 and the generator 3 may provide all electric energy to the driving motors 6 without charging the battery pack 4, so as to ensure a best power performance. Even in this case, the generator set including the turboshaft engine 1 and the generator 3 may also provide the electric energy from 30 kW to 60 kW directly to the driving motors 6, such that the range extender vehicle may run at a driving speed ranging from 150 km/h to 160 km/h until the gas is exhausted. With the control of the central controller 10, there may be three modes of the range extender vehicle.

First is a static charge mode. When the driving motors 6 are not in operation and the vehicle is static, the central controller 10 controls the generator 3 to charge the battery pack 4 slowly or quickly (whether to slowly or quickly charge the battery pack depends on user's demands).

Second is a moving charge mode. When the driving motors 6 work under a standard power, the generator 3 supplies power to the battery pack 4. When the driving motors 6 work under an ultra-high power, the generator 3 and the battery pack 4 together supply power to the driving motors 6 to instantaneously burst out most optimal performances of the vehicle.

Third is, when the electric energy of the battery pack is exhaust and it is required high driving performances (when the vehicle is running on a high-way), the generator 3 directly drives the driving motors 6 to work with a large power ranging from 30 kw to 60 kw, such that the vehicle may run at the driving speed ranging from 150 km/h to 160 km/h. And, the battery pack 4 is stopped to be charged. Until the power consumption reduces, the vehicle enters the moving charge mode. After the vehicle is static, the vehicle enters the static charge mode.

In detail, following acts are included.

At act S101, states of the driving motors 6 are judged by the central controller 10 according to working speeds of the driving motors 6.

If the driving motors 6 stop working, an act S102 is executed. That is the static charge mode is executed. The central controller 10 sends a signal to the generator 3 to charge the battery pack 4 slowly or quickly.

If the driving motors 6 work under a standard power, an act S103 is executed. That is, the central controller 10 sends a signal to the generator 3 to supply power to the battery pack 4.

If the driving motors 6 work under an ultra-high power, an act S104 is executed. That is, the central controller 4 sends a signal to both of the generator 3 and the battery pack 4, to together supply power to the driving motors 6. Furthermore, the central controller 10 monitors whether the electric energy of the battery pack 4 is exhausted.

If the central controller 10 monitors that the electric energy of the battery pack 4 is exhausted and it is judged that the driving motors 6 still work under the ultra-high power, an act S105 is executed. That is, the central controller 10 sends a signal to the generator 3 to directly drive the driving motors 6 with a large power ranging from 30 kw to 60 kw, such that the vehicle runs at a maximum driving speed ranging from 150 km/h to 160 km/h. And then, the battery pack 4 is stopped from charging.

If it is judged, by the central controller 10, that power consumption is low, that is, the driving motors 6 works under the standard power, the act S103 is executed. If it is judged, by the central controller 10, that the driving motors 6 stops working, the act S102 is executed.

A power transmission shaft of each of the above driving motors 6 is connected to a driving shaft of the corresponding wheel 11. There may be four or two driving motors 6. Each of the driving motors 6 may be provided with a sensor. The sensor is configured to sense the driving speed of the vehicle (that is working speeds of the driving motors 6). The sensor communicates with the central controller 10 via a line to transmit the working speed of the driving motor 6. If there are four driving motors 6, the power transmission shafts of the driving motors 6 are connected to the respective driving shafts of front and rear wheels 11 of the vehicle to drive the four wheels 11 (two front wheels and two rear wheels) to rotate. If there are two driving motors 6, only the front wheels 11 of the vehicle may be driven. Alternatively, if there are two driving motors 6, only the two rear wheels 11 of the vehicle may be driven.

A large amount of heat may be produced during a process that the battery pack 4 is frequently charged. Accordingly, the battery radiator 7 is also provided in embodiments of the present disclosure. There may be one or more battery radiators 7. A cold-air channel of the battery radiator 7 is directly connected to the battery pack 4, to cool down the battery pack 4 in time by utilizing the cold-air when the vehicle is driving.

The battery thermal energy management system (not illustrated) includes a temperature sensor and an actuator. The temperature sensor is connected to the actuator via a signal line. The temperature sensor is arranged at a surface of the battery pack 4. The actuator is connected to a switch of the turboshaft engine 1. The battery thermal energy management system monitors whether the battery pack 4 is over-heating in real time via the temperature sensor. If it is sensed that a heat productivity of the battery pack 4 in unit time exceeds a preset safe threshold by the temperature sensor, the actuator is triggered to start working. The actuator switches the switch of the turboshaft engine 1 off, to stop the turboshaft engine 1 from charging the battery pack 4.

A gas transmission pipe of the above gasholder 9 is connected to the gas-inputting pipe of the combustor of the turboshaft engine 1, for providing the gas to the turboshaft engine 1.

Figure 5:
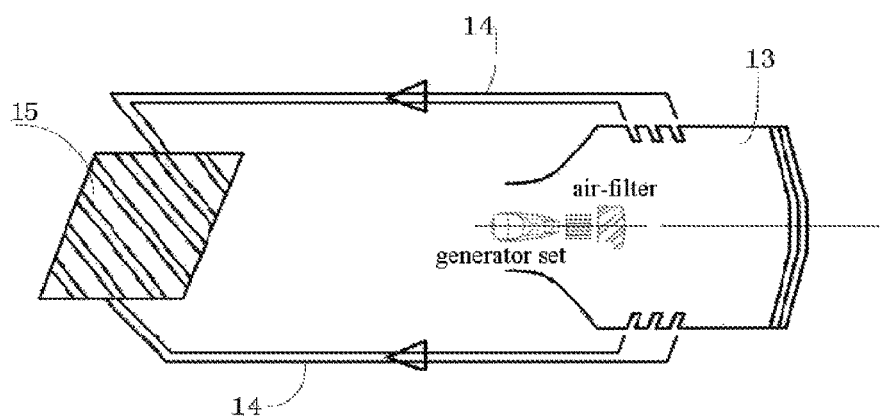
FIG. 5 is a schematic diagram illustrating a thermal energy recycling system added into a range extender vehicle according to embodiments of the present disclosure.

Another range extender vehicle is also provided in embodiments of the present disclosure. On the basis of the above embodiment, as illustrated in FIG. 5, the range extender vehicle further includes: a thermal energy recycling device 13, a thermal energy transmission pipe 14, and a compressed air heater 15.

The thermal energy recycling device 13 is arranged at a tail end of the combustor of the turboshaft engine 1, for absorbing thermal energy produced by burning gas in the turboshaft engine 1. The thermal energy recycling device 13 is a fin typed heat-exchanger to achieve a perfect thermal energy absorbing performance.

An input end of the thermal energy transmission pipe 14 is connected to the thermal energy recycling device 13, and an output end of the thermal energy transmission pipe 14 is connected to the compressed air heater 15. With the thermal energy transmission pipe 14, the thermal energy recycled by the thermal energy recycling device 13 is transmitted to the compressed air heater 15.

Two branch pipes are arranged at an output end of the compressor air heater 15. One is connected to the inlet of the combustor of the turboshaft engine 1, for heating the air entered into the turboshaft engine 1, thereby improving combustion performances of the turboshaft engine 1. The other one is connected to a warm-air outlet of the vehicle, for vehicle heating.

It may be seen from the above embodiments of the present disclosure that, the range extender vehicle according to embodiments of the present disclosure has more efficient turboshaft engine than ones in the related art. By innovation and optimization, the range extender vehicle according to embodiments of the present disclosure has advantages of a high power to weight ratio, low power consumption, a low amount of emissions, low noise and vibration, an easy maintenance and a long service life.

An overall design and arrangement of the range extender vehicle according to embodiments of the present disclosure completely fulfill the advantages of the turboshaft engine, and in combination with the generator, the battery pack and the central controller, forms a highly efficient, stable, and environmental friendly system.

It should be noted that, although the present disclosure has been described with reference to the specific embodiments and the drawings, the above descriptions are exemplary for understanding purposes to those skilled in the art and details of component shown in the drawings are not construed to limit the present disclosure. It should also be appreciated by those skilled in the art that, the embodiments merely show schematic implementations of the present disclosure, and do not limit the scope of the present disclosure.

What is claimed is:

1. A range extender vehicle, comprising wheels and a vehicle frame, wherein the range extender vehicle further comprises:
    a turboshaft engine arranged on a chassis of the vehicle frame; a turboshaft engine controller; a generator, a battery pack; a battery controller; driving motors, a battery radiator, a gasholder, a thermal energy recycling device; a thermal energy transmission pipe and a compressed air heater;
    a signal end of the turboshaft engine is connected to the turboshaft engine controller, a transmission shaft of the turboshaft engine is connected to a rotation shaft of the generator and is configured to drive the generator to produce electric energy;
    the generator is configured to output the produced electric energy to the battery pack and the driving motors; the battery pack is connected to the driving motors, and a signal end of the battery pack is connected to the battery controller;
    a power transmission shaft of each of the driving motors is connected to a driving shaft of the corresponding wheel;
    a cold-air channel of the battery radiator is connected to the battery pack;
    a gas-transmission pipe of the gasholder is connected to a gas-inputting pipe of a combustor of the turboshaft engine, for providing gas to the turboshaft engine;
    the thermal energy recycling device is arranged at a tail end of the combustor of the turboshaft engine, for absorbing thermal energy produced by burning gas in the turboshaft engine;
    an input end of the thermal energy transmission pipe is connected to the thermal energy recycling device, and an output end of the thermal energy transmission pipe is connected to the compressed air heater; and
    two branch pipes are arranged at an output end of the compressor air heater, a first pipe of the two branch pipes is connected to an inlet of the combustor of the turboshaft engine, for heating gas entered into the turboshaft engine, and a second pipe of the two branch pipes is connected to a warm-air outlet of the vehicle, for vehicle heating.

2. The range extender vehicle according to claim 1, further comprising:
    a central controller;
    wherein a signal end of the generator, the signal end of the battery pack and signal ends of the driving motors are connected to the central controller, and the generator is configured to output electric energy of rated power to the battery pack and the driving motors according to a control ratio provided by the central controller.

3. The range extender vehicle according to claim 1, wherein the thermal energy recycling device comprises a fin typed heat-exchanger.

4. The range extender vehicle according to claim 1, comprising two or four driving motors.

5. The range extender vehicle according to claim 1, wherein the turboshaft engine comprises:
    a combustor, a pressure-regulating nozzle, an intake turbine, an outtake turbine, a tailpipe and a transmission shaft;
    wherein the intake turbine employs a first turbine rotor with suspension rotation mode on which first guide vanes are arranged, and the first guide vanes are mounted at an inlet of a gas-inputting pipe of the combustor, and the first guide vanes are configured to guide gas to the gas-inputting pipe;
    an inlet of the combustor is connected to the gas-inputting pipe, and a tail end of the combustor is provided with the transmission shaft and the outtake turbine.

6. The range extender vehicle according to claim 1, wherein the outtake turbine employs a second turbine rotor with suspension rotation mode on which second guide vanes are arranged, wherein an outlet of a cavity where the second guide vanes are located is connected to an inlet of the tailpipe; the pressure-regulating nozzle is arranged at the front of the inlet of the combustor, to regulate a gas pressure for entering into the combustor.

* * * * *